United States Patent [19]
Palmer et al.

[11] Patent Number: 5,914,045
[45] Date of Patent: Jun. 22, 1999

[54] PORTABLE WATER FILTRATION SYSTEM AND METHOD

[76] Inventors: Carl W Palmer, 32545-B Golden Lantern, #244; Michelle R Palmer, 32545-B Golden Lantern, both of Dana Point, Calif. 92629

[21] Appl. No.: 08/813,268

[22] Filed: Dec. 23, 1996

Related U.S. Application Data

[60] Provisional application No. 60/009,164, Dec. 26, 1995.

[51] Int. Cl.[6] .............. B01D 37/00; C02F 1/28; C02F 1/76
[52] U.S. Cl. ............ 210/694; 210/753; 210/136; 210/232; 210/335; 210/342; 210/205; 210/282; 210/472; 210/474; 210/416.3; 210/206; 422/261; 222/189.08; 222/189.09
[58] Field of Search .................... 210/282, 472, 210/464, 466, 468, 469, 266, 474, 136, 661, 679, 680, 681, 682, 691–694, 753, 232, 335, 342, 205–206, 416.3; 422/261; 222/189.08, 189.09

[56] References Cited

U.S. PATENT DOCUMENTS

| | | |
|---|---|---|
| 2,389,185 | 11/1945 | Dick . |
| 3,220,555 | 11/1965 | Silha . |
| 3,335,917 | 8/1967 | Knight . |
| 4,938,389 | 7/1990 | Rossi et al. ............... 210/321.64 |
| 5,066,468 | 11/1991 | Arnold et al. ............... 210/753 |
| 5,122,272 | 6/1992 | Iana et al. ............... 210/473 |
| 5,167,819 | 12/1992 | Iana et al. ............... 210/474 |
| 5,265,770 | 11/1993 | Matkovich et al. ............ 210/500.38 |
| 5,417,860 | 5/1995 | Kay ............... 210/472 |
| 5,431,813 | 7/1995 | Daniels ............... 210/282 |
| 5,609,759 | 3/1997 | Nohren, Jr. et al. ............ 210/266 |
| 5,616,242 | 4/1997 | Mandola ............... 210/238 |
| 5,653,878 | 8/1997 | Reid ............... 210/266 |
| 5,688,397 | 11/1997 | Malmborg ............... 210/136 |

*Primary Examiner*—Robert Popovics
*Attorney, Agent, or Firm*—James G. O'Neill

[57] ABSTRACT

A filter assembly for a flexible, portable bottle having a sealing cap including a filter attached to the interior of the cap to filter out substantially all INORGANICS, ORGANICS, RADIOLOGICAL CHEMICALS AND MICROBIOLIGY. The filter assembly also may include a second filter or Iodinator sealed in the flexible bottle to further remove micro-organisms from water passing therethrough. The filter assembly is designed so that the flexible bottle must be pressurized, as by being hand pressed, after it is filled with water to force flow of water through the either or both of the filters. The filter in the cap includes a check valve to allow the bottle to be repressurized after water has been dispensed from the bottle.

18 Claims, 2 Drawing Sheets

PORTABLE WATER FILTRATION SYSTEM AND METHOD

CROSS REFERENCE TO RELATED APPLICATIONS

This is a replacement application for provisional application Ser. No. 60/009,164, filed on Dec. 26, 1995.

BACKGROUND OF THE INVENTION
1. Field of the Invention

This invention relates generally to water filtration and more particularly to an improved, portable water filtration system and method. 2. Description of Related Art Water filtering means are widely known and used in numerous applications. It is important when comparing different kinds of filtration processes, and different kinds of products, that we obtain an understanding of the abilities and inabilities of each. The water source and particular "product need" are necessary to make sure one uses the correct drinking water products in order to solve specific problems and reduction of specific contaminants and/or pollutants. With so many varying water problems and products throughout the world, an analysis or test of specific needs should be made.

There are four (4) major types of water pollution, namely:
1) INORGANICS
   Aesthetic—Taste, odor and clarity.
   Wet Chemistry—chlorine, turbidity and total suspended solids.
   Heavy Metals—Aluminum, cadmium. chromium, copper, lead, etc.
2) ORGANICS
   Industrial—VOLATILE ORGANIC COMPOUNDS (VOC), Trihalomethanes (THM), etc.
   Agriculture—Organochlorine pesticides, PCB's, EBCP and EDB.
3) RADIOLOGICAL CHEMICALS
   Radon zzz.
4) MICROBIOLOGY (Iodinator)
   Coliform, Fecal Coliform, R. Terrigene, Crytosporidium, Giardia L.

Each filtration and/or purification process has different abilities and inabilities of removing the contaminants mentioned above. These include: 1) Sediment filtration, which is primarily used to remove silt, sand and suspended items. Sediment filters come in many sizes, such as 20 micron to remove particles that are 20 microns in size or larger. 2) Granulated activated carbon filtration (GAC), which are very effective at removing some chlorine, chloroform, trihalomethane, VOC, pesticides, herbicides and other organic chemicals. This type of filter is responsible for improving clarity, taste and odor, and the characteristics of the quality or type of GAC—dwell time, volume and flow rate have to be considered to create the best results for absorption of pollutants in water. The present invention uses Powder Activated Coconut Carbon (PAC), which is considered to be the very highest quality and smallest of the carbon medias. 3) Ultrafiltration, which is the design of very fine filters or ultra-filtration filters created for use in removing the contaminants listed above. These filters have the ability to remove pathogens that are larger than the pore size of the fine filter. Giardia, Cryptosporidium, and other micro-organisms measuring 2–10 microns in size. With the filter assembly of the present invention, particularly the Micro-PAC combination, up to 99.9% of the pollutants can be removed. Although some prior water filters are known which solve some of the above mentioned filter needs, there still exists the need in the art for a less cumbersome, easy to use, substantially low-cost filter system and method that efficiently filters and purifies water held in a flexible bottle.

The filter system of the present invention provides a product that has the greatest capability to improve filtration and purification for more of the total pollution area. This is preferably done by providing a multi-phase filter purification system, using media that is smaller than 5 micron in pore size and other media. The present invention has been specifically designed to be effective in all of the pollution areas identified above, namely, INORGANICS, ORGANICS, RADIOLOGICAL CHEMICALS AND MICROBIOLOGY. Available testing data shows the improved abilities of the present invention to remove high percentages of all of these contaminants or pollutants.

Additionally, the present invention may include an "Iodinator" which has the ability to kill Micro-organisms, if adequate time is allowed for questionable water to stand after the water has passed through an Iodinator to insure proper kill rate. After the water has been given sufficient time for exposure to the iodide the flexible bottle is then pressed or squeezed by the hand of a user to force the water back through the Iodinator and then through the primary filter. The primary filter has sorbent material that has the capability of removing iodine and iodide from the water, plus the remaining dead pathogens. The design of this portable filtration system is that it can be used with or without either of the filters, depending upon the need of a user.

Basically, the filter system of the present invention is mounted in a flexible, portable bottle. The system includes a first or primary filter assembly attached to the cap. This primary filter assembly includes a PAC filter impregnated with sorbent media and a check valve assembly with a filter mounted therein. When the cap is removed from the flexible bottle, the flexible bottle is filled with questionable water and the cap is replaced and tightened to seal the bottle. A nozzle outlet or valve at the tip of the cap may then be pulled upwardly or turned to open the same and the flexible bottle is squeezed to force water through the filter attached to the cap, whereby clean filtered water will exit the cap through the open nozzle or valve. The valve is preferably bonded to the bottom of the primary filter to allow air recovery or pressure equalization in the bottle, in order that the bottle may repressurize itself after the water has been pressed through the primary filter system. The nozzle outlet or valve is then closed to seal the unit after use.

A second filter or Iodinator may be inserted or held in the interior near an open end of the flexible bottle. The Iodinator is a preferably a rigid, porous plastic resin having Iodinated resins impregnated therein and when questionable water is initially poured into the bottle such water passes through the Iodinator for the purpose of killing or terminating micro-organisms. The questionable water is held in an inner chamber of the bottle for specific periods of time, depending upon different kill rates for any micro-organisms that might be present. This process, therefore, also keeps the system disinfected. The Iodinator is designed for consistent and predictable Iodine elution levels, absorption, release and kill rates.

SUMMARY OF THE INVENTION

Accordingly, it is a general object of the present invention to provide an improved portable bottle filter assembly. It is a particular object of the present invention to provide a compact PAC water filter in a cap applied to a flexible, portable bottle. It is a more particular object of the present invention to provide a dual filter assembly for a portable bottle. It is a further object of the present invention to provide a compact Iodinator inserted and held in a portable bottle. It is yet a more particular object of the present invention to provide a dual stage filter assembly for a flexible, portable bottle having additional filtering and purification capabilities. It is a still more particular object of the present invention to provide an improved method of filtering water in a flexible, portable bottle by providing an improved filter system. And it is a yet a still more particular object of the present invention to provide an improved method of filtering water in a flexible, portable bottle by providing a dual step process.

In accordance with one aspect of the invention, there is provided a filter assembly for a flexible, portable bottle. The filter assembly includes a first PAC filter associated with a cap which fits over the open end of the flexible body of the bottle to filter out substantially all pollutants. The filter assembly also may include a second filter or Iodinator held in the flexible body of the bottle to further remove microorganisms from water passing through the Iodinator. The filter assembly is designed so that the flexible body of the bottle must be pressurized, as by being hand pressed, after it is filled with water to force flow of water through either or both of the filters, and includes a check valve to allow air to be replaced in the bottle after pressure is removed from the bottle. The present invention also comprises a novel method of filtering water by using a flexible, portable bottle having a filter assembly in which water is first poured into the bottle, a cap is then sealed to the bottle, a valve opened on the cap, and the water in the bottle is then forced through the filter assembly by squeezing the bottle.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved filter assembly for use in a portable bottle.

Figure 1:
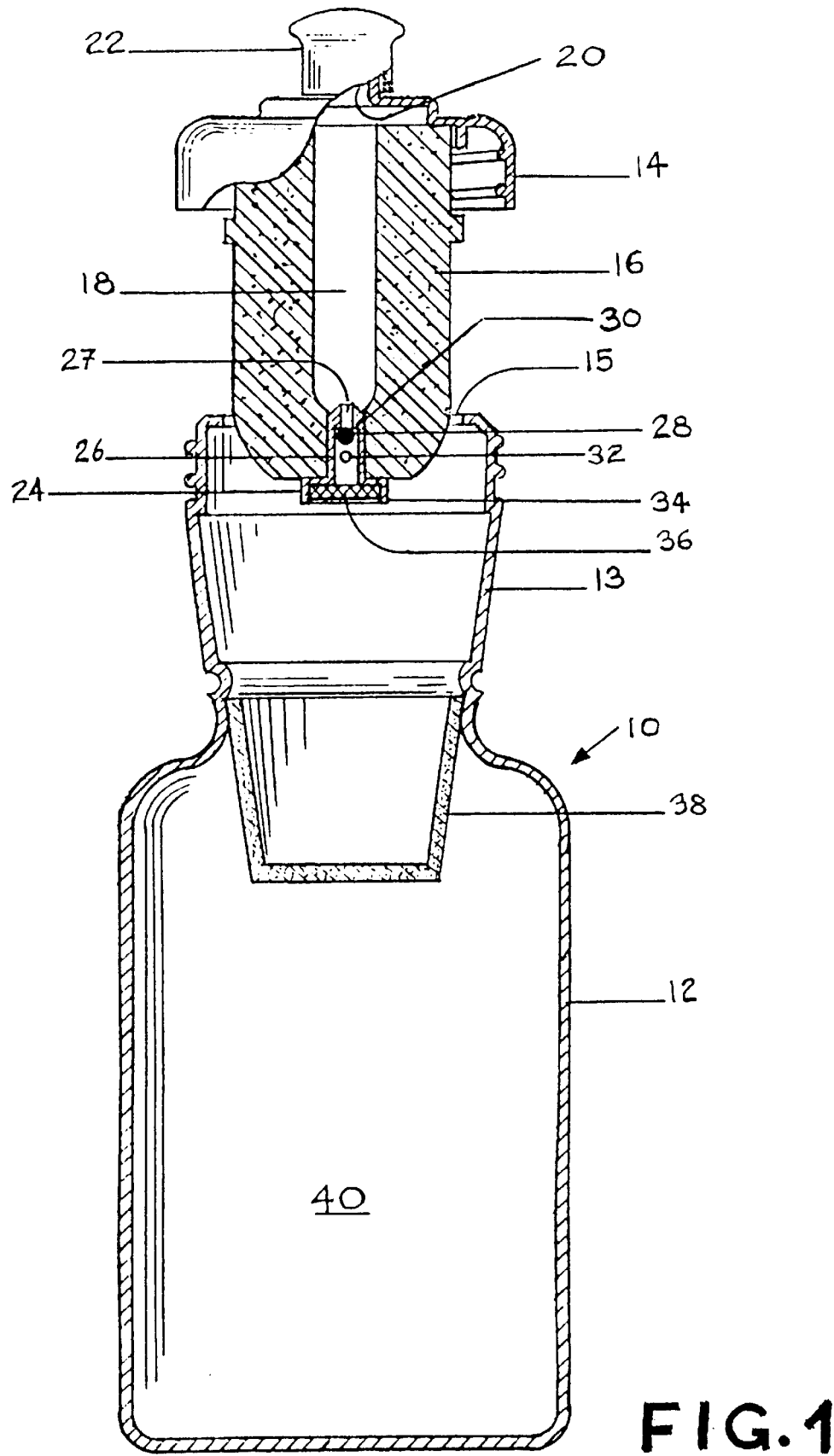
FIG. 1 is a cross-sectional view of a preferred embodiment of the flexible, portable bottle and dual filter assembly of the present invention.
Figure 2:
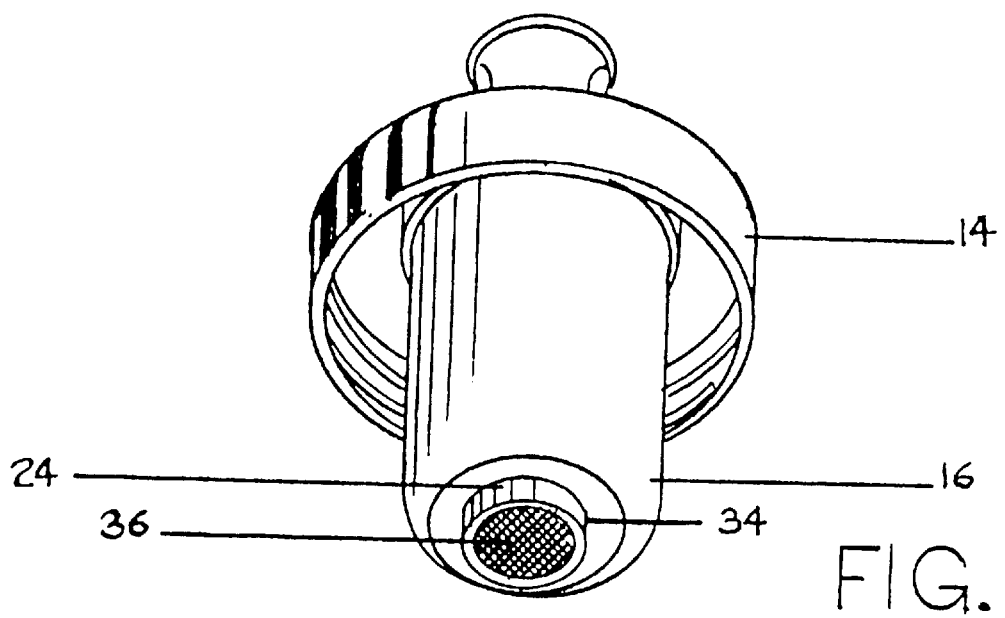
FIG. 2 is a perspective view of the cap for the flexible, portable bottle of FIG. 1, having a first filter assembly with a check valve therein.
Figure 3:
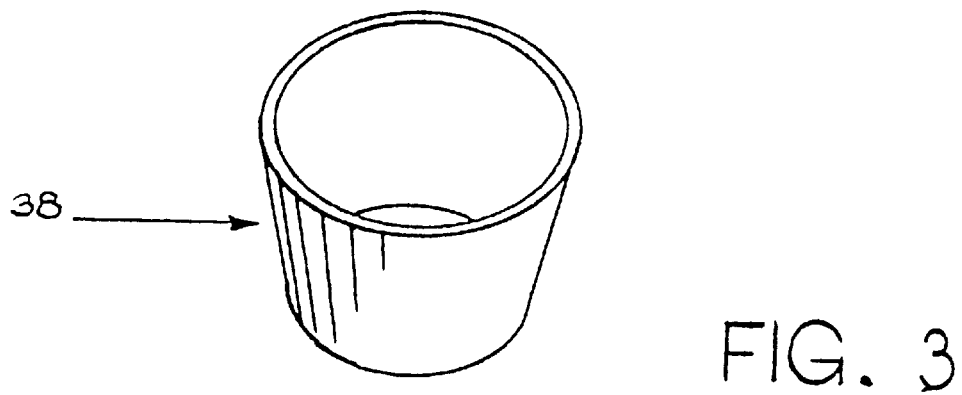
FIG. 3 is a perspective view of the second filter or Iodinator which may be inserted or held in the interior of the bottle of FIG. 1.

Turning now to the drawings, FIG. 1 shows a portable bottle 10, having a flexible body 12, made from polyethylene, PVC, PET, or polypropylene. The body 12 includes a narrowed neck or top portion 13 having an opening 15 therein. A cap 14 of the type that may be applied to a reduced neck or top 13 of the bottle 12 in a water-tight/air-tight manner, as by being screwed thereon, has a first filter assembly or means 16 secured thereto. The first filter 16 is preferably formed as a one piece cylindrical element having an open central chamber 18. The cylindrical element is preferably molded so as to have a porosity of from 2 to 8 microns. The cylindrical filter 16 is preferably molded from a porous plastic material having a granulated powder, such as a Coconut PAC and impregnated with a further sorbent media designed to reduce water contamination—pollutants greater than 90%. If desired, the exterior of the cylindrical filter element 16 may have an Iodide/Anion Resin coated thereon. The contaminants—pollutants removed by this first filter element 16 are those 4 types described above.

The upper end of the cylindrical filter 16 is secured in the interior of the cap 14, in any desired manner, as by bonding, so that the open central chamber 18 is fluidly connected to an opening 20 passing through the cap and connected to a nozzle outlet or valve means 22. The nozzle outlet or valve means 22 is opened and closed by sliding or rotating, in a manner well known to those skilled in the art.

The other or lower end of the cylindrical filter 16 and open central chamber 18 has a check valve 24, secured in the open central chamber and designed to function for the equalization of air pressure in the bottle 12 when the bottle is closed by the cap 14. The check valve 24 has an inner end comprised of an elongated cylindrical body 26 which is secured, in any desired manner, in the open central chamber 18, to seal the lower end of the filter element 16. The inner end of the cylindrical body 26 is fluidly connected to the open central chamber 18 by a passage 27. As shown in FIG. 1, a ball valve 28 will be seated against a valve seat 30 around passage 27 in elongated cylindrical body 26 when the bottle is pressurized, as by squeezing the sides of flexible body 12. When not pressurized, the ball valve 28 will move away from the valve seat 30, as by gravity, and will preferably be held in position by a holding means 32, such as a pin or the like.

The other or outer end 34 of the check valve 24 is preferably enlarged, and includes a further or secondary filter 36 therein. This filter 36 is to maintain the integrity of the interior of the check valve 24 in a medical grade condition, and acts to block any foreign materials in contaminated water from entering the check valve when pressure is applied to the body 12 when forcing water through the filter 16. The filter 36 may be held in the enlarged area 34 by any desired means, such as by a sealing lip formed or placed over the exterior thereof, or by bonding the filter 36 in the enlarged end.

The bottle 10 may also have a second filter means 38 inserted or secured inside of the flexible body 12. This second filter means 38 is preferably sealingly secured in the body 12, in any desired manner, such as by bonding the exterior surface of filter 38 to the interior surface of body 12. The second filter means 38 is preferably a molded ionated cup or Iodinator which has a dual action providing three unique properties. First, water poured into the bottle 12 is captured in the cup or Iodinator and will eventually pass through the Iodinator so that the iodine in the Iodinator 38 is eluted into the water. This water and iodine remains in an interior chamber or water storage area 40 in the body 12. The key to this unique function is that it allows extraordinary killing power of pathogens in the water stored in area 40. Secondly, after storage for a predetermined length of time, when the bottle 12 is pressurized the stored water in area 40 will be pressed back through the Iodinator 38 into the cup. As it passes through the Iodinator again it gets a second exposure to the iodine therein. At the same time, the water passing back through the Iodinator will clean or flush off the inner surface of the cup 38, acting as a self sanitizing or cleaning feature for the cup 38. Lastly the water then passes through the first or primary micro porous 2 to 8 micron filter element 16 where greater than 90% of the dead pathogen bodies, i.e., pyrogens, will be blocked or filtered out. The sorbent in the primary or first filter 16 has the capability of removing residual iodine and iodide from water passing therethrough.

One major value of the filter system of the present invention having either or both of the primary and the secondary filters therein is that the Iodinator works as a continuing bactericide so that the entire filter system remains sanitized.

As discussed above, in use, the flexible, portable bottle 10 of the present invention is used to filter and purify water. In the preferred embodiment of the invention, the assembly 10 has a body and cap of any desired size, such as presently available flexible bottles, and each of the filters 16 and 38 are sized and dimensioned to produce the best possible results, no matter what the condition of the water that is poured into the bottle. For example, the filter 16 may be approximately 2 to 2 and ½ inches long with a diameter of approximately 1 to 1 and ½ inches and the cup shaped Iodinator 38 may be about 1 to 1 and ⅜ inches long and about 1.5 inches in diameter at its top or widest end and 1.25 inches in diameter at its bottom or smallest end, with walls approximately 0.125 inches thick.

Accordingly, as will be apparent to those skilled in the art, the present invention filter assembly provides considerable advantages in ease and flexibility of use and in the efficient removal of contaminants from water.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claim is:

1. A portable bottle having a flexible hollow body and a cap with valve means, the improvement comprising:
   at least a first filter assembly;
   said first filter assembly being secured to an interior surface of said cap so as to be in said flexible hollow body when said cap is secured to said flexible hollow body;
   said first filter assembly including a cylindrical body having an open central chamber having two open ends, a first of said two open ends being secured to said interior surface of said cap so that said open central chamber is fluidly connected to an opening passing through said cap, a second of said two ends being closed by check valve means held therein; and
   said cylindrical body having a porosity of from 2 to 8 microns and being fabricated from a porous plastic material having a powdered activated carbon therein so as to filter water passing therethrough.

2. The portable bottle of claim 1 wherein said check valve means has a ball valve cooperating with a valve seat held therein to control the flow of air through said open central chamber.

3. The portable bottle of claim 2 wherein said ball valve is normally moved away from said valve seat unless pressure is applied to said flexible hollow body.

4. The portable bottle of claim 2 wherein said check valve means has two ends with one of the two check valve means ends being enlarged and carrying a further filter element therein.

5. The portable bottle of claim 1, further including sorbent media in said first filter means and a second filter held inside of said flexible hollow body.

6. The portable bottle of claim 5 wherein said second filter is a cup having iodine impregnated therein so as to elute iodine to water poured into said flexible hollow body and through said cup having iodine impregnated therein into a storage area in said flexible hollow body.

7. The portable bottle of claim 6 wherein with said valve means opened in said cap and said flexible hollow body is pressurized, said water stored in said storage area is pressed back through said cup having iodine impregnated therein.

8. The portable bottle of claim 7 wherein said water pressed back through said cup having iodine impregnated therein will flush off an inner surface of said cup having iodine impregnated therein.

9. The portable bottle of claim 8 wherein said water, after being pressed through said cup having iodine impregnated therein will then be pressed through said first filter assembly into said open central chamber for passage through said valve means in said cap.

10. A method of filtering water comprising the steps of:
    selecting a flexible, portable bottle having a removable cap with a valve means thereon, said cap being attached to one end of a first filter assembly, a second end of said first filter assembly having a check valve attached thereto;
    securing a second filter assembly having iodine therein in said flexible, portable bottle;
    passing water through said second filter assembly into said flexible, portable bottle;
    securing said cap to said flexible, portable bottle in an air tight manner;
    opening said valve means on said cap;
    squeezing said flexible bottle to force said water therein, back through said second filter assembly, then through said first filter assembly, and through said valve means in said cap.

11. The method of filtering water of claim 10 wherein said first filter assembly comprises sorbents including powdered activated carbon.

12. The method of filtering water of claim 11, further including the step of stopping the squeezing of said bottle with said valve means open to allow air to be sucked back through said valve means and said check valve.

13. A portable bottle having a flexible hollow body and a cap with valve means, the improvement comprising:
    a first filter element;
    said first filter element comprising a cup shaped body and being secured to an interior surface of said flexible hollow body;
    said cup shaped body including iodine impregnated therein;
    said cup shaped body eluting iodine to any water poured into said cup shaped body as it passes through said cup shaped body into a storage area in said flexible body; and
    a second filter element having two ends, one end being connected to an interior surface of said cap, the other end having a check valve contained therein, so that when said flexible body is squeezed, water contained therein passes through said first filter element and said second filter element, with said check valve allowing air to enter said flexible body through said cap and said second filter element when the squeezing ceases.

14. The portable bottle of claim 13, further including a filter assembly secured in said cap, said filter assembly having an open central chamber with two open ends; a first of said two open ends being secured to in an interior of said cap so that said open central chamber is fluidly connected to an opening passing through said cap; a second of said two open ends being closed by check valve means held therein.

15. The portable bottle of claim 14 wherein said check valve means has a ball valve cooperating with a valve seat held therein to control the flow of air through said open central chamber; said ball valve being normally moved away from said valve seat unless pressure is applied to said flexible hollow body; and said check valve having two ends with one of the two check valve ends being enlarged and carrying a further filter element therein.

16. The portable bottle of claim 15 wherein said cylindrical body has a porosity of from 2 to 8 microns and is fabricated from a porous plastic material having a powdered activated carbon and a sorbent media therein.

17. The portable bottle of claim 16 wherein with said valve means opened in said cap and said flexible hollow body pressurized, said water stored in said storage area is first pressed back through said cup shaped body and then pressed through said cylindrical body into said open central chamber for passage through said valve means in said cap.

18. The portable bottle of claim 17 wherein when said water is pressed back through said cup shaped body said water will flush off an inner surface of said cup shaped body.

* * * * *